United States Patent [19]

Yamano et al.

[11] Patent Number: 4,636,445
[45] Date of Patent: Jan. 13, 1987

[54] METAL/HYDROGEN ALKALINE STORAGE BATTERY

[75] Inventors: Masaru Yamano; Takashi Sakai; Nobuhiro Furukawa, all of Hirakata; Shuzo Murakami, Ibaraki; Takanao Matsumoto, Nishinomiya, all of Japan

[73] Assignee: Sanyo Electric Co., Ltd., Osaka, Japan

[21] Appl. No.: 841,058

[22] Filed: Mar. 17, 1986

Related U.S. Application Data

[63] Continuation-in-part of Ser. No. 677,677, Nov. 30, 1984, abandoned.

[30] Foreign Application Priority Data

| Aug. 10, 1984 | [JP] | Japan | 59-167993 |
| Aug. 10, 1984 | [JP] | Japan | 59-167994 |
| Aug. 17, 1984 | [JP] | Japan | 59-172086 |
| Sep. 6, 1984 | [JP] | Japan | 59-186878 |
| Oct. 18, 1984 | [JP] | Japan | 59-219937 |
| Oct. 18, 1984 | [JP] | Japan | 59-219938 |

[51] Int. Cl.$^4$ .............................. H07M 2/12
[52] U.S. Cl. ........................ 429/53; 429/59; 429/101; 429/206
[58] Field of Search ............ 429/53–55, 429/57, 59, 206, 223, 174, 185, 101

[56] References Cited

U.S. PATENT DOCUMENTS

| 3,579,387 | 5/1971 | Voyentzie et al. | 429/206 X |
| 3,884,722 | 5/1975 | Tucholski | 429/206 X |
| 3,954,506 | 5/1976 | Sullivan | 429/217 |
| 3,959,018 | 5/1976 | Dunlop et al. | 429/206 X |
| 4,004,943 | 1/1977 | Boter | 429/223 X |
| 4,214,043 | 7/1980 | Van Deutekom | 429/223 X |
| 4,216,274 | 8/1980 | Bruning et al. | 429/57 |
| 4,401,733 | 8/1983 | Shirai et al. | 429/185 X |

FOREIGN PATENT DOCUMENTS 103541 9/1978 Japan .
46827 10/1983 Japan .

Primary Examiner—Brian E. Hearn
Assistant Examiner—Stephen J. Kalafut
Attorney, Agent, or Firm—Wenderoth, Lind & Ponack

[57] ABSTRACT

The present invention is directed to a metal/hydrogen alkaline storage battery, which comprises a positive electrode of a metal oxide, a negative electrode of a hydrogen-storage alloy, and a separator impregnated with an alkaline electrolyte and placed between the positive and negative electrodes. The electrodes and separator are housed within a sealed type battery casing. The casing has a device for maintaining the pressure in the battery in a selected range of from an equilibrium pressure required for absorbing hydrogen by the negative electrode to about 20 kg/cm$^2$.

9 Claims, 15 Drawing Figures

METAL/HYDROGEN ALKALINE STORAGE BATTERY

This application is a continuation-in-part of now abandoned application Ser. No. 677,677, filed Nov. 30, 1984 now abandoned.

BACKGROUND OF THE INVENTION

The present invention relates in general to a storage battery. More particularly, the invention relates to a metal/hydrogen alkaline storage battery having a negative electrode comprising a hydrogen-storage alloy and a positive electrode comprising a metal oxide.

Lead acid and nickel/cadmium storage batteries have been used ordinarily. Recently, a metal/hydrogen storage battery has attracted public attention, since it is light in weight and capable of exhibiting a high capacity. Some of the metal/hydrogen storage batteries have a positive electrode comprising a metal oxide such as nickel hydroxide and a negative electrode comprising a hydrogen-storage alloy capable of absorbing and desorbing hydrogen reversibly. The hydrogen-storage electrode comprising a metal hydride, i.e. hydrogen-storage alloy, has been produced generally by a process disclosed in Japanese Patent Publication No. 58-46827 wherein the hydrogen-storage alloy powder is sintered together with an electroconductive material powder to form a porous body to be used as the hydrogen-storage electrode, or a process disclosed in Japanese Patent Laid-Open No. 53-103541 wherein the hydrogen-storage alloy powder is bound with the electroconductive material powder by means of a binder.

The capacity of the thus manufactured hydrogen-storage electrode is determined by the amount of the absorbed hydrogen, i.e. active material and, therefore, the larger this amount, the better. The amount of hydrogen absorbed by the hydrogen-storage electrode depends greatly on the temperature and pressure. Generally, the higher the temperature, the higher the hydrogen-absorption pressure. However, some of the hydrogen-storage alloys used for constituting the negative electrode can not absorb hydrogen unless the pressure is elevated considerably even at a low temperature. When an open type storage battery is prepared by using a hydrogen-storage alloy having the property for constituting the negative electrode, the negative electrode cannot absorb hydrogen, since no sufficient pressure can be attained. Even when the storage battery is of the sealed type, a considerably high pressure is necessary for the battery to absorb hydrogen by the negative electrode. Such a storage battery is too dangerous to be used in general.

Further, when the charge and discharge are repeated in an alkaline electrolyte, the hydrogen-storage alloy used for the negative electrode is expanded and shrunk repeatedly due to the absorption and desorption of hydrogen and, consequently, the lattice of the alloy is deformed and the alloy is pulverized into a fine powder gradually. As a result, the fine powder falls off from the alloy to reduce the capacity and, in addition, the mechanical strength of the electrode and the conductivity are also reduced remarkably. Thus, it has been difficult to keep the capacity of the battery for a long time.

SUMMARY OF THE INVENTION

An object of the present invention is to provide an improved metal/hydrogen alkaline storage battery wherein a hydrogen-storage negative electrode is capable of absorbing a sufficient amount of hydrogen to exhibit a stable negative electrode capacity.

Another object of the invention is to provide a metal/hydrogen alkaline storage battery wherein the falling off of the finely pulverized hydrogen-storage alloy due to the repeated charge and discharge is controlled so that the deterioration of the capacity of the battery and reduction of the mechanical strength and the electrode conductivity are inhibited and a high capacity can be maintained in the charge/discharge cycles for a long time.

Still another object of the invention is to provide a metal/hydrogen alkaline storage battery wherein an electrolyte in a minimum required amount is maintained near the negative electrode comprising a hydrogen-storage alloy and the amount of the electrolyte is determined on the basis of a balance between the battery life and the discharge properties so that the pulverization of the hydrogen-storage alloy into fine powders is controlled.

A further object of the invention is to provide a metal/hydrogen alkaline storage battery having a high capacity and a long life by controlling the concentration of the electrolyte.

Another object of the invention is to provide a metal/hydrogen alkaline storage battery, which permits a smooth heat dissipation from the hydrogen-storage electrode so that hydrogen can be absorbed sufficiently even at the end of charge or even at a high temperature so as to have a capacity substantially equal to that exhibited at room temperature.

The metal/hydrogen alkaline storage battery of the present invention comprises a positive electrode comprising a metal oxide, a negative electrode comprising a hydrogen-storage alloy, a separator impregnated with an alkaline electrolyte and placed between the positive and negative electrodes, and a sealed type battery casing for housing the positive and negative electrodes and the separator, the casing having means of maintaining the pressure in the battery below about 20 kg/cm$^2$, preferably; in the range of from a pressure required for the absorption of hydrogen by the negative electrode to below about 20 kg/cm$^2$.

The hydrogen-storage negative electrode alloy absorbs hydrogen during charge and it desorbs hydrogen during discharge. Though the amount of hydrogen absorbed by the negative hydrogen-storage electrode varies depending on the kinds of the hydrogen-storage alloy, it is increased generally as the ambient pressure is elevated. After a given pressure has been attained, in other words, after the ambient pressure has been elevated to an equilibrium pressure for the absorption of hydrogen by the negative electrode, the amount of absorbed hydrogen becomes substantially constant. Even when the pressure is elevated further, the amount of the absorbed hydrogen is not increased. When the pressure in the metal/hydrogen alkaline storage battery is elevated to higher than 20 kg/cm$^2$, the movement of the electrolyte in the battery becomes difficult and the capacity of the negative electrode is reduced. At a temperature higher than 70° C., a chemical reaction of the hydrogen-storage alloy occurs in the alkaline electrolyte of a high temperature to cause a material change and, in addition, the self discharge of the negative electrode is increased to deteriorate the storage characteristics. Thus, in the storage battery having the above-mentioned structure, the elevation of the pressure in the battery to higher than 20 kg/cm² can be prevented and the stable absorption and desorption of hydrogen by the hydrogen-storage alloy constituting the negative electrode becomes possible.

In a preferred embodiment of the present invention, the hydrogen-storage alloy is selected from those capable of absorbing hydrogen at a temperature of 70° C. or less under a pressure of 20 kg/cm² or less, such as, for example, LaNi, LaCo, CaNi and TiNi alloys wherein their first or second metallic component is partially replaced with other metals. In this embodiment, the aforementioned means for maintaining the battery pressure is preferably a valve which acts under a pressure in the range of from an equilibrium pressure in the absorption of hydrogen by the negative electrode to about 20 kg/cm².

The negative electrode comprises a hydrogen-storage alloy retained by an alkali-resistant synthetic resin binder (preferably, non-sintered fluororesin constituting a fibrous binding reticulation) and a thickener (preferably polyethylene oxide). In another preferred embodiment, the positive and negative electrodes are rolled with the separator interposed between them into a swirl to form an electrode body. The roll-constituting pressure of the swirled electrode body is 1.0 to 5.0 kg/cm². A preferred electrolyte is 15 to 35 wt.% aqueous potassium hydroxide solution and its amount is preferably 0.50 to 2.10 ml per AH of a theoretical capacity of the negative electrode. In another embodiment of the present invention, the battery casing is made of a metal and its inner surface is in contact with the negative electrode which constitutes the outer periphery of the electrode body directly or via a greasy heat-conductive substance.

DETAILED DESCRIPTION OF PREFERRED EMBODIMENTS

The preferred embodiments of the present invention will now be described with reference to the drawings.

EXAMPLE 1

The description will be made with reference to a nickel/hydrogen battery which is a typical battery having a negative electrode comprising a hydrogen-storage alloy and a positive electrode comprising a metal oxide.

LaNi$_5$ capable of absorbing hydrogen was mechanically divided into a fine powder, to which was added 1 to 5 wt.%, based on the fine LaNi$_5$ powder, of polytetrafluoroethylene (PTFE) powder, the particles of which could be formed into fibers easily even by a low shear force to effect plastic deformation. Both powders were kneaded homogeneously to form polytetrafluoroethylene fibers. The product was molded under a pressure of 1 ton/cm² to form a hydrogen-storage electrode having a diameter of 30 mm and a thickness of 2 mm.

The hydrogen-storage electrode thus obtained was combined with a known sintered nickel positive electrode having a discharge capacity of 500 mAH and an alkaline electrolyte was poured therein to provide a sealed type nickel/hydrogen alkaline storage battery A. In the battery A of this example, the battery casing was fitted with a safety valve (FIG. 11) which acts under a pressure of 15 kg/cm² so that the pressure in the battery would not be elevated to higher than 20 kg/cm². Batteries B and C were prepared in the same manner as above except that LaNi$_5$ was replaced with CaNi$_5$ and LaNi$_{4.6}$Al$_{0.4}$, respectively.

Figure 1:
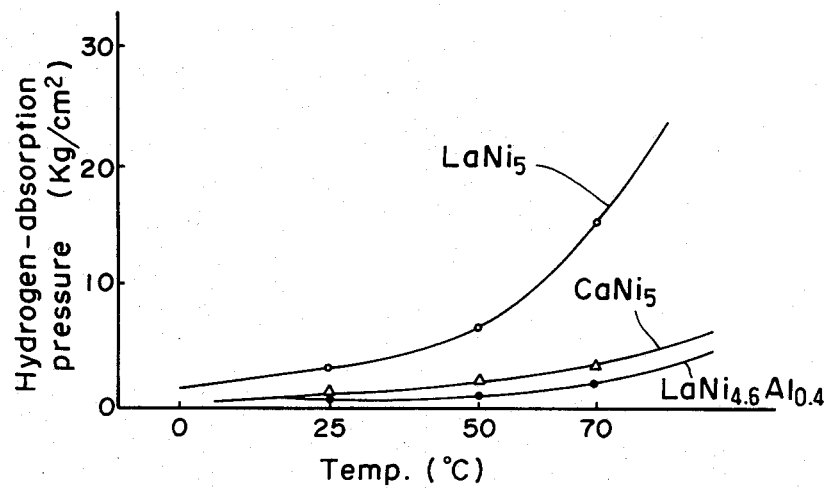
FIG. 1 shows a relationship between the temperature and the hydrogen absorption pressure obtained when LaNi$_5$, CaNi$_5$ or LaNi$_{4.6}$Al$_{0.4}$ is used as the hydrogen-storage alloy for forming the negative electrode.
Figure 2:
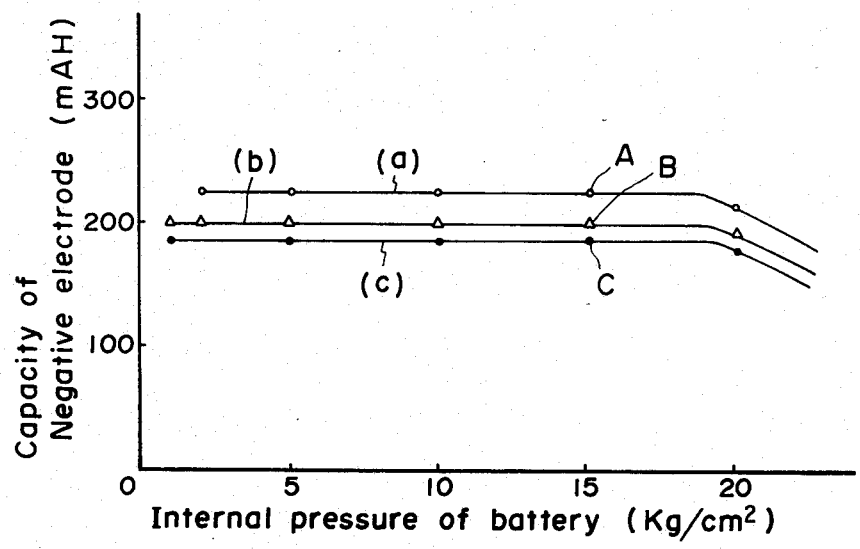
FIG. 2 shows, as the symbols (a), (b) and (c), the results of the measurement of the capacities of the negative electrode of storage batteries A, B and C, each containing the hydrogen-storage alloys shown in FIG. 1, respectively, at room temperature under various pressures in the battery.

FIG. 1 shows a relation between the temperature of LaNi$_5$, CaNi$_5$ or LaNi$_{4.6}$Al$_{0.4}$ used for the preparation of the negative electrode of the battery A, B and C and the hydrogen absorption pressure. In all the cases, the hydrogen absorption pressure was below 20 kg/cm² at temperatures below 70° C. FIG. 2 shows the results (a) to (c) obtained in the measurement of the negative electrode capacity while the pressure in the batteries A to C was varied at room temperature. The batteries A, B and C in which the working pressure of the safety valve was 15 kg/cm² had internal pressures and negative electrode capacities shown by points A, B and C.

It is apparent from FIGS. 1 and 2 that though a sufficient capacity of the negative electrode can be obtained under a pressure higher than an equilibrium pressure of the hydrogen-storage alloy, the capacity is reduced under a pressure of as high as 20 kg/cm². A reason why the capacity of the negative electrode is reduced under an internal pressure of 20 kg/cm² or higher is that the distribution of the electrolyte becomes ununiform as the internal pressure of the battery is elevated. Particularly in the metal/hydrogen battery wherein hydrogen is generated by electrolysis of water and the hydrogen absorption reaction in the negative electrode is exothermic, water present in and around the negative plate is decreased. In the battery wherein the pressure is kept low, the electrolyte moves smoothly from the positive electrode or separator towards the negative electrode to effect the charge reaction. However, when the pressure in the battery is elevated to higher than 20 kg/cm$^2$, the movement of the electrolyte kept in the constituting parts in the battery becomes difficult and, therefore, the charge reaction hardly proceeds. Further, in this type of battery, the resistance under overcharge is increased and the discharge is inhibited by accumulation of the gas and, as a result, the charge and discharge in the subsequent cycles become insufficient and unfavorable. Accordingly, to obtain a sufficient capacity of the negative electrode, the pressure in the battery should be kept at 20 kg/cm$^2$ or lower and the hydrogen-storage alloy to be contained in the negative electrode should be capable of absorbing and desorbing hydrogen under pressure of lower than 20 kg/cm$^2$.

The amount of hydrogen absorbed by the hydrogen-storage alloy is influenced greatly by temperature and pressure. The pressure in the sealed type battery should be 20 kg/cm$^2$ or lower. When the temperature is elevated to 70° C. or higher, the following defects are brought about:

(1) Generally, the hydrogen-storage alloy is chemically reacted in an alkaline electrolyte having a high temperature to cause a material change and the reversible reaction of the absorption/desorption of hydrogen becomes impossible. Therefore, as the cycle is repeated, the capacity is reduced gradually.

(2) The self discharge of the positive electrode and the hydrogen-storage electrode is increased to deteriorate the storage characteristics. Particularly, the discharge (desorbing of hydrogen) of the hydrogen-storage alloy is an endothermic reaction and, therefore, the self discharge is accelerated at a high temperature.

(3) According to the creep behavior of the alkaline electrolyte, leakage occurs easily to make it difficult to seal the battery by caulking. Thus, a specific structure such as hermetic seal is necessitated.

(4) In the metal/hydrogen alkaline storage battery, the oxygen gas-generating reaction is accelerated to reduce the charge efficiency at the positive electrode such as a nickel electrode. Therefore, it is necessary to use a hydrogen-storage alloy capable of absorbing and desorbing hydrogen at a temperature of 70° C. or lower for the manufacture of the negative electrode.

From the above-described facts, it will be understood that the hydrogen-storage alloy used for the manufacture of the negative electrode of the metal/hydrogen alkaline storage battery should be capable of absorbing and desorbing hydrogen at a temperature of 70° C. or lower under a pressure of 20 kg/cm$^2$ or lower. In the practical manufacture of the battery, an alloy capable of absorbing and desorbing hydrogen at a temperature at which the battery will be used under a pressure of 20 kg/cm$^2$ or lower is selected suitably from the above-mentioned hydrogen-storage alloys. A hydrogen-storage alloy capable of absorbing and desorbing hydrogen at 70° C. under a pressure of 20 kg/cm$^2$ or lower is preferred, since such an alloy can be used at a temperature over a wide angle of up to 70° C. because the hydrogen-absorption pressure of the hydrogen-storage alloy lowers generally as the temperature lowers.

Thus, the metal/hydrogen alkaline storage battery having a stable capacity of the negative electrode can be obtained, since the negative, hydrogen-storage electrode is capable of absorbing and desorbing a sufficient amount of hydrogen.

EXAMPLE 2

A hydrogen electrode is prepared in such a manner that a mixture containing the hydrogen-storage alloy powder is contact-bonded to the opposite surface of a collector. The thus formed hydrogen-storage electrode was combined with a known, sintered nickel positive electrode having a discharge capacity of 1.5 AH, with a separator interposed between them. The obtained assembly was rolled up under a roll-constituting pressure shown in the following Table 1 and the outer periphery of the roll was fixed with a tape to obtain a rolled electrode body. This body was inserted into a battery casing. The alkaline electrolyte was poured therein and the body was sealed to obtain nickel/hydrogen alkaline batteries D, E, F, G, H, I and J having a nominal capacity of 1.5 AH.

TABLE 1

| Battery | D | E | F | G | H | I | J |
|---|---|---|---|---|---|---|---|
| Roll-constituting pressure (kgh/cnm$^2$) | 0.5 | 1.0 | 2.0 | 3.0 | 4.0 | 5.0 | 6.0 |

Figure 3:
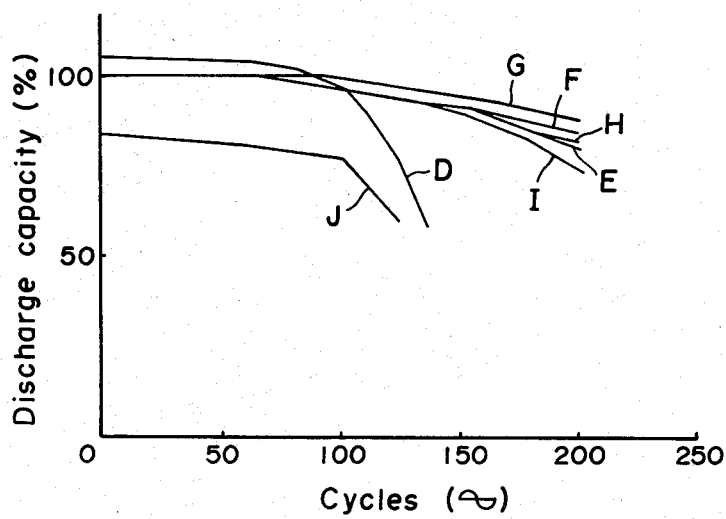
FIG. 3 shows cycle characteristics of seven nickel/hydrogen alkaline storage batteries having a nominal capacity of 1.5 AH.
Figure 4:
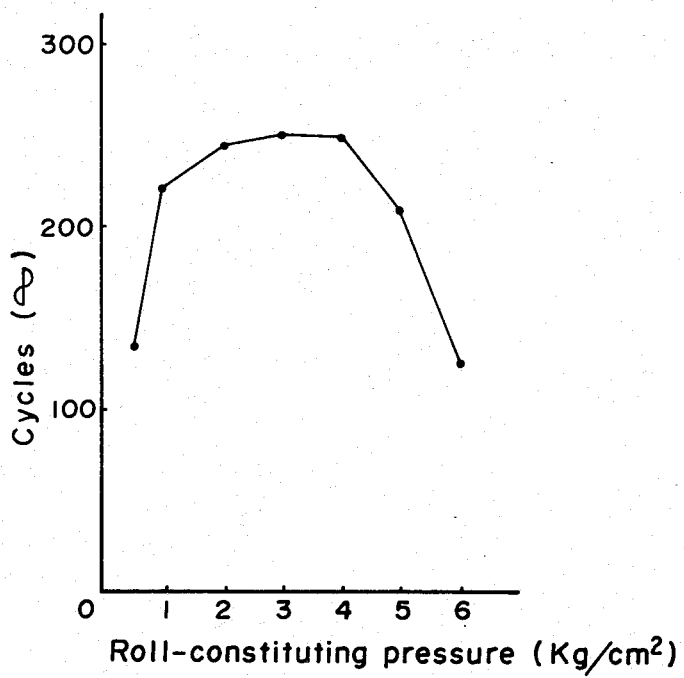
FIG. 4 shows a relationship between the roll-constituting pressure of the electrode body and the cycle life of the battery.

FIG. 3 shows cycle characteristics of the abovementioned batteries D through J. The battery was repeatedly charged and discharged under cycle conditions of charging at the 10-hour rate up to 150% of the nominal capacity and then discharging at the 5-hour rate to the end voltage of 1.0 V. The results are represented by assuming the initial capacity of the batteries E to I as 100. FIG. 4 shows a relationship between the cycles repeated until the discharge capacity falls to 60% of the initial capacity of the batteries E to I and the roll-constituting pressure of the electrode body. It is apparent from FIG. 3 that though the battery D having the lowest roll-constituting pressure of the electrode body had a high initial capacity, its cycle deterioration was serious, and the battery J having the highest roll-constituting pressure had a low initial capacity. By contrast, the batteries E to I had a high initial capacity and only slight cycle deterioration. The reason therefor is presumably as follows, judging from the fact that when the batteries were demounted after completion of the cycles, the shape change of the negative electrode of the battery D was most serious. Namely, the battery D had a roll-constituting rate of as low as only 0.5 kg/cm$^2$ and, therefore, the electrode body thereof contained a large amount of the electrolyte to make the battery reaction smooth. Accordingly, though the initial storage of the battery D was high, the hydrogen-absorbing alloy constituting the negative electrode was gradually pulverized into fine powder which dropped off from the hydrogen-storage alloy due to the low roll-constituting pressure of the electrode body, to accelerate the reduction of the capacity. On the other hand, in the battery J having the highest roll-constituting pressure (6.0 kg/cm$^2$) of the electrode body, the penetration of the electrolyte into the electrode body is only small because of the high roll-constituting pressure and, therefore, the electrode body contained only a small amount of the electrolyte and, as a result, the reactive surface area of the electrode is limited. Consequently, the smooth battery reaction was inhibited seriously by the reduction of the charge efficiency due to the generation of hydrogen gas and increase of the internal resistance due to the accumulation of the gas. Thus, the capacity was low even in the initial stage. Further, as the charge/discharge cycle was repeated, the insufficiency of the charge became remarkable to shorten the cycle life. In the batteries E to I wherein the roll-constituting pressure of the electrode body was in the range of 1.0 to 5.0 kg/cm$^2$, even when the hydrogen-storage alloy in the negative electrode was finely pulverized, the fine powder of the alloy did not drop off but was maintained in the electrode body by virtue of the roll-constituting pressure and, therefore, the deterioration of the capacity of the negative electrode and the reduction of the mechanical strength and conductivity of the electrode were controlled. In addition, since the roll-constituting pressure was sufficient for retaining the electrolyte, the smooth battery reaction could be effected and the high capacity could be maintained for a long time.

In above Example 2 wherein the battery had the rolled electrode body having a preferred roll-constituting pressure of 1.0 to 5.0 kg/cm$^2$, even when the hydrogen-storage alloy in the negative electrode was finely pulverized by the repeated charge/discharge cycles, the fine alloy powder was kept in the electrode body by the roll-constituting pressure to control the dropping off and, in addition, the electrode body was capable of containing the electrolyte in an amount sufficient for the battery reaction. Thus, the battery capacity could be maintained for a long time.

EXAMPLE 3

A hydrogen-storage electrode having a size of 4 cm×5 cm and a thickness of 1 mm was prepared in substantially the same manner as in Example 1. An electrode body was formed from this electrode and a sintered nickel positive electrode having a capacity of 2000 mAH with a separator interposed between them. The electrode body was inserted in the battery casing. The alkaline electrolyte was poured therein and the casing was sealed to obtain a nickel/hydrogen battery of sealed type.

Figure 5:
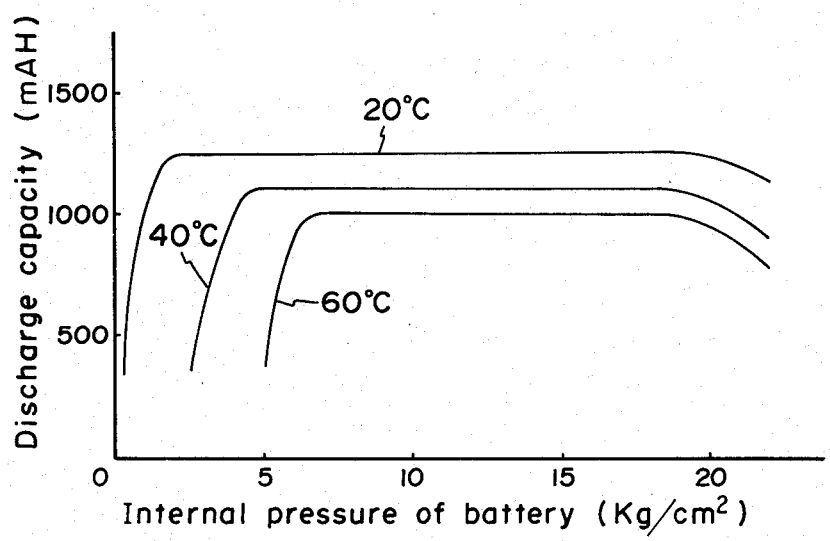
FIG. 5 shows a relationship between the internal pressure of the nickel/hydrogen alkaline battery and the discharge capacity of the battery.

FIG. 5 shows a discharge capacity of the negative electrode observed at temperatures of 20°, 40° and 60° C. under various internal pressures of the battery. It is apparent from FIG. 5 that the capacity of the negative electrode was increased at any of these temperatures as the internal pressure of the battery was elevated and, after a given pressure (i.e. an equilibrium pressure wherein the hydrogen-storage electrode can absorb hydrogen efficiently) had been attained, the capacity of the negative electrode was not increased even when the internal pressure of the battery was elevated. Under a pressure of higher than 20 kg/cm$^2$, the capacity was reduced.

Figure 11:
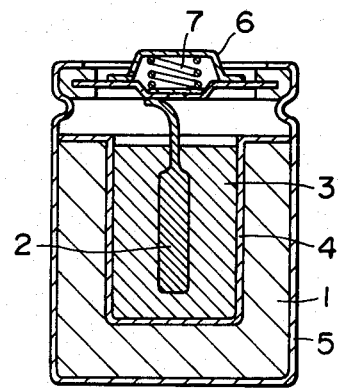
FIGS. 11 and 12 are cross sections showing the structure of the battery of the present invention.

The battery was sealed with a sealing lid fitted with a safety valve having a working pressure of 3, 15 or 22 kg/cm$^2$, the valve being shown at 7 in FIG. 11. The charge/discharge cycle was repeated at 40° C. and the capacity of the negative electrode was measured. The results are shown in the following Table 2.

TABLE 2

| Working pressure of valve | Capacity of negative electrode |
| --- | --- |
| 3 kg/cm$^2$ | 600 mAH |
| 15 kg/cm$^2$ | 1100 mAH |
| 22 kg/cm$^2$ | 900 mAH |

It is understood from the above table that the capacity of the negative electrode of the battery having the valve working pressure of 15 kg/cm$^2$ was higher than those of the batteries having the working pressures of 3 and 22 kg/cm$^2$. The reason why the capacity of the negative electrode of the battery having the valve working pressure of 3 kg/cm$^2$ was low is that the valve was opened before the internal pressure of the battery was elevated to the hydrogen equilibrium pressure of the hydrogen-storage electrode and, therefore, no sufficient pressure could be obtained. On the other hand, the reason why the capacity of the negative electrode of the battery having the valve working pressure of 22 kg/cm$^2$ was low is that the distribution of the electrolyte became seriously uniform when the internal pressure of the battery exceeded 20 kg/cm$^2$ as described in Example 1. By contrast, in the battery having the valve working pressure of 15 kg/cm$^2$, the valve did not work until the pressure in the hydrogen-storage electrode reached the hydrogen absorption equilibrium pressure, and the internal pressure would not elevate to higher than 20 kg/cm$^2$ which would make the procedure of the charge reaction difficult. Therefore, the pressure in the battery could be maintained suitably for the sufficient absorption of hydrogen by the hydrogen-storage electrode. Namely, the capacity of the negative electrode was high. The working pressure of the valve which facilitates the absorption of hydrogen by the hydrogen-storage electrode ranges from the hydrogen absorption equilibrium pressure to 20 kg/cm$^2$. By setting the working pressure within this range, the capacity of the negative electrode can be increased efficiently.

It will be understood from FIG. 5 that the internal pressure of the battery required for attaining the maximum capacity varies depending on the charge/discharge temperature of the battery. This pressure is equal to the equilibrium pressure in the hydrogen absorption of the hydrogen-storage electrode at a given temperature and this pressure is elevated as the temperature is elevated. The working pressure of the valve is thus determined according to the conditions of practical use of the battery. The upper limit of the valve working pressure has been determined already as above and the lower limit thereof is elevated as the temperature is elevated. Therefore, the valve working pressure is fixed to that realized at the supposed highest temperature in course of the practical use. In such a case, the maximum capacity of the negative electrode can be obtained even at a temperature lower than said temperature.

EXAMPLE 4

An electrode comprising a hydrogen-storage alloy powder retained by means of an alkali-resistant synthetic resin binder and a thickener was employed so that the dropping off of the finely pulverized hydrogen-storage alloy due to the repeated charge/discharge would be controlled as described in Example 2. The binders usable herein include fluororesins such as polytetrafluoroethylene (PTFE), tetrafluoroethylene/hexafluoropropylene copolymer (FEP), tetrafluoroethylene and hexafluoropropylene; chloroprene resins, nitrile rubber resins and styrene rubber resins; polystyrene; and nylon polyamides. The thickners include hydroxypropylcellulose (HPC); polyethylene oxide (PEO), unsaturated polyester resins (aerosils), methylcellulose (MC), carboxymethylcellulose (CMC), polyvinylacohol (PVA), polyvinylpyrrolidone, polyacrylic acid, polyacrylamide, crosslinked starch, sodium acrylate, sodium alginate and sodium silicate.

In an example of the invention, LaNi$_5$ capable of absorbing hydrogen was mechanically divided into a fine powder. Based on the weight of the fine LaNi$_5$ powder, 5 wt.% of polytetrafluoroethylen (PTFE) powder as a binder, the particles of which can be formed into fibers easily by a low shearing force to effect the plastic deformation, and 1% of polyethylene oxide (PEO) as a thickener, were added thereto. The obtained mixture was kneaded homogeneously to form polytetrafluoroethylene fibers. The fibrous mixture was rolled and pressed against both sides of a current collecter to obtain a hydrogen-storage electrode.

The obtained electrode was combined with a known, sintered nickel positive electrode having a discharge capacity of 2.0 AH and an alkaline electrolyte solution was poured therein to form a nickel/hydrogen battery K having a nominal capacity of 2.0 AH. For comparison, a comparative battery L was also prepared in the same manner as above except that polyethylene oxide (PEO) as a thickener was not incorporated into the hydrogen-storage electrode.

Figure 6:
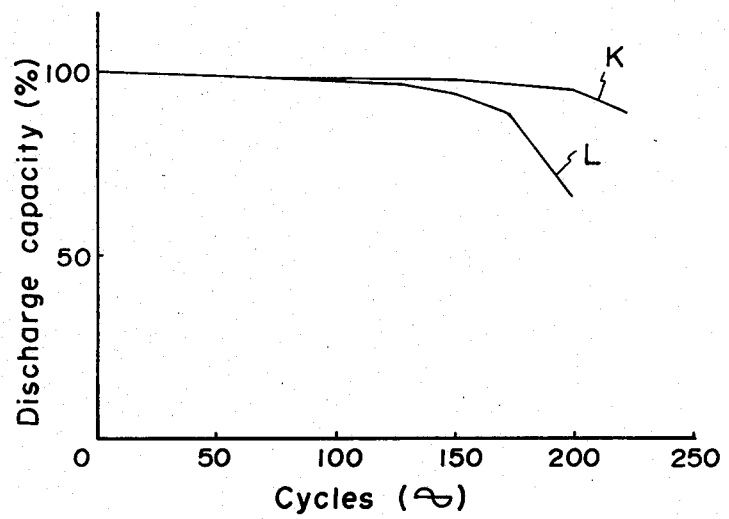
FIG. 6 shows charge/discharge cycle characteristics of the nickel/hydrogen alkaline battery wherein the hydrogen-storage electrode contains a thickener, as compared with that of the same battery containing no thickener.

FIG. 6 shows the charge/discharge cycle characteristics of the batteries K and L. The battery was repeatedly charged and discharged under cycle conditions of charging at the 10-hour rate up to 150% of the nominal capacity and then discharging at the 5-hour rate to an end voltage of 1.0 V. The results are represented by assuming the initial capacity of each battery as 100%. It is understood from FIG. 6 that, unlike the case of the comparative battery L, the reduction of the capacity of the battery K after the repetition of the charge/discharge cycles was minimized favorably. After completion of the cycle tests, the batteries were demounted to reveal that the shape change of the hydrogen-storage electrode in the comparative battery L was remarkable. This fact suggests that when the pulverization of the hydrogen-storage alloy proceeds in the course of the repetition of the charge/discharge cycles, the dropping off of the finely pulverized hydrogen-storage alloy cannot be controlled sufficiently by only the binder comprising the polytetrafluoroethylene in fine fibrous form. By contrast, the shape change of the hydrogen-storage electrode in the battery K was much less than that of the comparative battery L. This is because the battery K contained the thickener in addition to the binder and they retain the powdered hydrogen-storage alloy firmly.

EXAMPLE 5

In this example, a process different from the above examples was tried to control the pulverization of the hydrogen-storage alloy. It was found that a suitable control of the amount of the electrolyte in the battery is quite effective for the control of the pulverization. The details were as follows.

A hydrogen-storage electrode manufactured in the same manner as in Example 1 was combined with a known, sintered nickel positive electrode having a discharge capacity of 2.0 AH to obtain a nickel/hydrogen battery having a nominal capacity of 2.0 AH. The theoretical capacity of the negative electrode was adjusted to a value thrice that of the positive electrode. An aqueous potassium hydroxide solution having a concentration of about 30 wt.% was used as the electrolyte. The amount of the electrolyte was in the range of 0.40 to 2.30 ml per AH of the theoretical capacity of the negative electrode as shown in the following Table 3.

TABLE 3

| Battery | M | N | O | P | Q | R | S |
|---|---|---|---|---|---|---|---|
| Amount of the electrolyte (ml/AH) | 0.40 | 0.50 | 0.90 | 1.30 | 1.70 | 2.10 | 2.30 |

Figure 7:
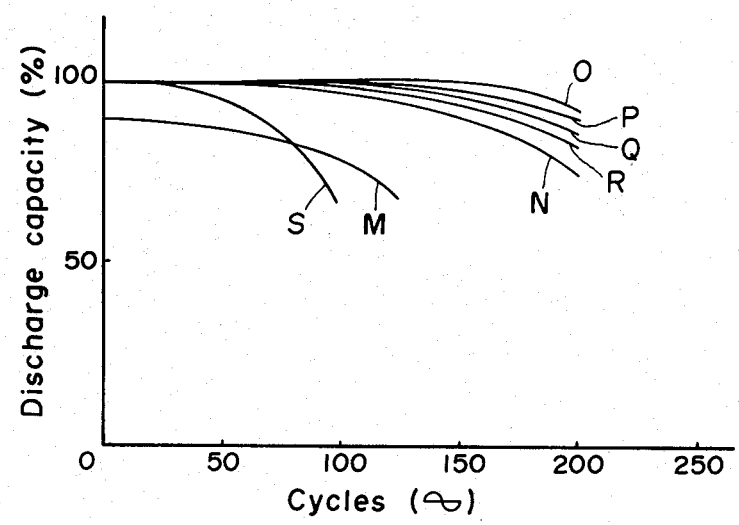
FIGS. 7 and 8 show the charge/discharge cycle characteristics of various batteries containing various amounts of the electrolyte and their 5-hour rate charge/discharge characteristics, respectively.

FIG. 7 shows the charge/discharge cycle characteristics of the respective batteries. The battery was repeatedly charged and discharged under cycle conditions of charging at the 10-hour rate up to 150% of the nominal capacity and then discharging at the 5-hour rate to the end voltage of 1.0 V. The results are represented by assuming the initial capacity of the battery S as 100. It is understood from FIG. 7 that the battery M containing the smallest amount of the electrolyte had a low initial performance due to ununiform distribution of the electrolyte. Namely, the charge/discharge reactions in the hydrogen-storage electrode was inhibited seriously and the charge insufficiency was accelerated by an increased resistance in the battery due to the insufficiency of the amount of the electrolyte, thereby shortening its life. On the other hand, in the battery S containing the largest amount of the electrolyte, the dropping off of the finely pulverized hydrogen-absorbing alloy was accelerated as the number of cycles increased, to shorten its life. In addition, the amount of the electrolyte was reduced remarkably by the elevation of the internal pressure. The batteries N to R had a life of as long as over 200 cycles, supposedly because the above-mentioned unfavorable causes were overcome.

Figure 8:
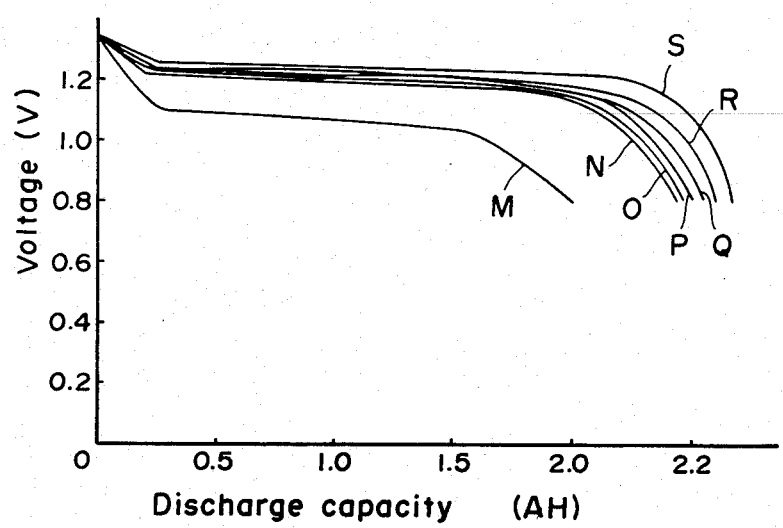

FIG. 8 shows 5-hour rate charge/discharge characteristics. It will be understood that the deterioration of the discharge characteristics of the battery M containing the insufficient amount of the electrolyte was serious. Substantially no difference could be recognized among the batteries N to S. This fact suggests that from the viewpoint of only the discharge characteristics, the large amount of desorbing causes no trouble.

Thus, the performance of the battery having the hydrogen-stage electrode can be improved by suitably controlling the amount of the electrolyte. Namely, excellent charge and discharge characteristics can be obtained by controlling the amount of the alkaline electrolyte in the range of 0.50 to 2.10 ml per AH of the theoretical capacity of the negative electrode.

Figure 9:
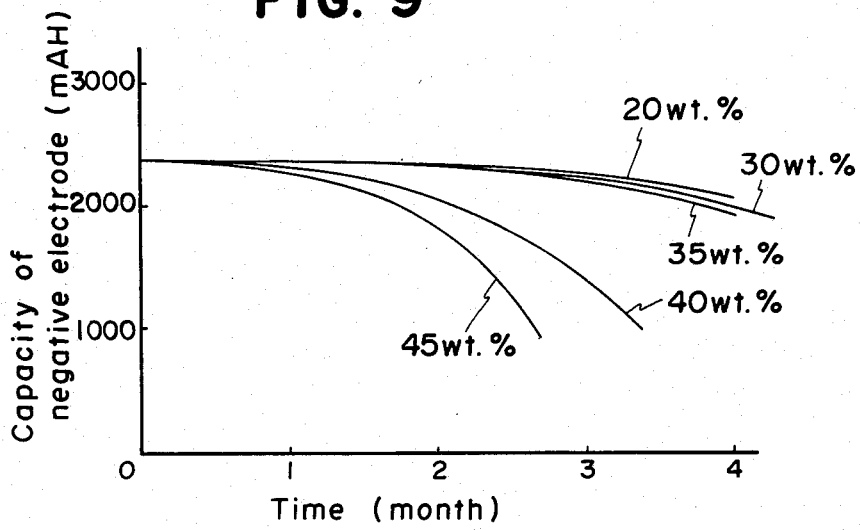
FIGS. 9 and 10 show a relationship between the standing time of batteries having various electrolyte concentrations and the capacity of the negative electrode and a relationship between the quantities of the charge and discharge of the batteries, respectively.

Reasons why the preferred range of the concentration of the aqueous potassium hydroxide solution is limited to 15 to 35 wt.% are as follows, referring to FIGS. 9 and 10 in which the amount of electrolyte used is 1.70 ml per AH: From FIG. 9 showing the relationship between the storage period of batteries having various electrolyte concentrations and the capacity of the negative electrode thereof, it is understood that as the storage period is prolonged with the 40% electrolyte, the surface layer of the hydrogen-storage alloy is corroded to form La(OH)$_3$ and Ni(OH)$_2$ and to reduce the hydrogen-absorbing capacity seriously and, consequently, the capacity of the battery is reduced. This is caused by segregation or formation of the hydroxide film. The original hydrogen-storage alloy composition (LaNi$_2$) cannot be recovered by repetition of the charge/discharge cycle and also the initial capacity cannot be recovered. Therefore, to avoid the change of the hydrogen-storage alloy composition, the concentration of the electrolyte should be controlled to up to about 35 wt.%.

Figure 10:
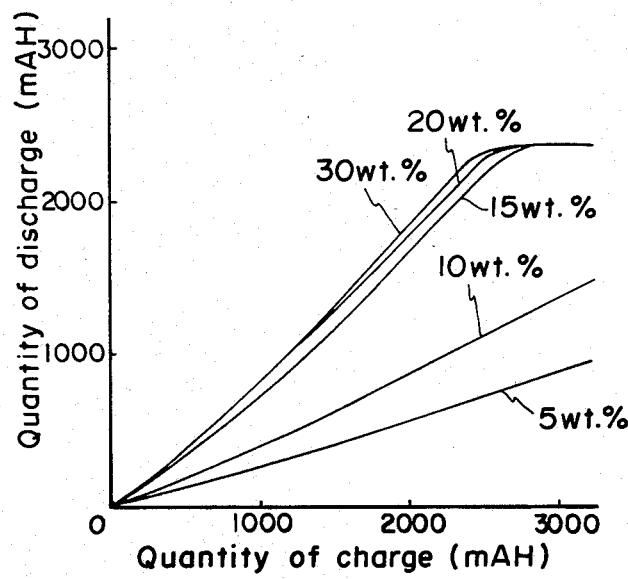

Referring to FIG. 10 which shows the relationship between the quantities of charge and discharge in batteries having various concentrations of the electrolyte, it is understood that the charge efficiency is reduced remarkably as the concentration of the electrolyte is lower than about 15 wt.%. In addition, the amount of hydrogen gas formed is increased to elevate the internal pressure of the battery unfavorably. This fact suggests that the concentration of the electrolyte should be at least about 15 wt.% for attaining a high charge efficiency. Although not shown, similar results were obtained also when other hydrogen-storage alloys such as CaNi$_5$ were used.

Figure 13:
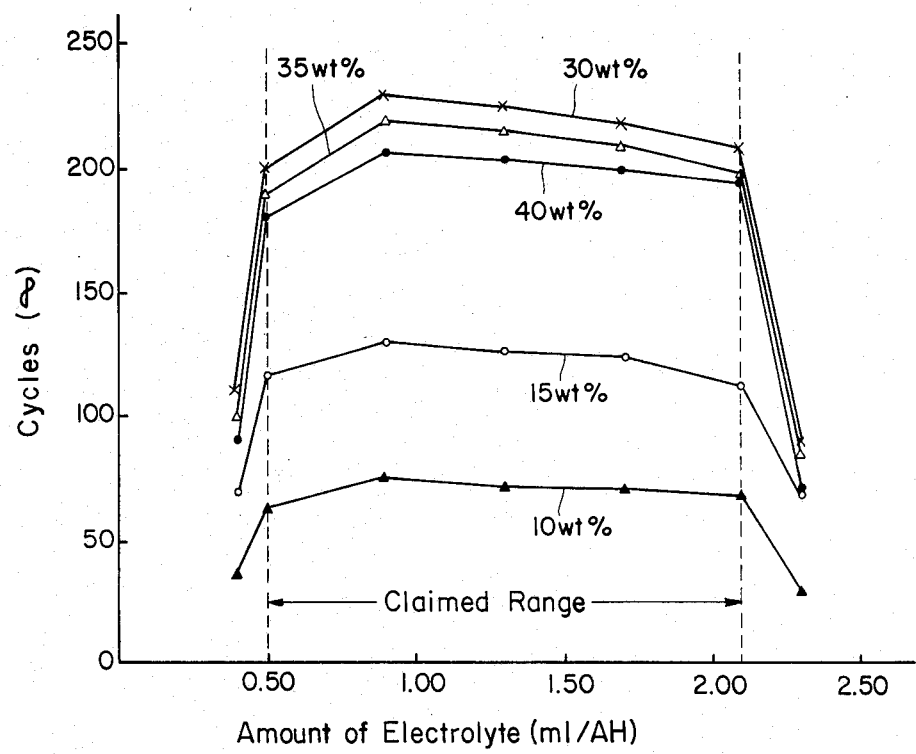
FIG. 13 shows the relationship between the amount of electrolyte and cycle characteristics at certain electrolyte concentrations.

FIG. 13 represents test data showing the relationship between the amount of the electrolyte and cycles when the concentration of the electrolyte is fixed at 10, 15, 30, 35 and 40% by weight with respect to the batteries of Example 5. FIG. 13 shows that the necessary amount of the electrolyte with respect to each concentration is in the range of 0.5-2.1 ml/AH, as far as "cycles" are concerned. The "cycles" means cycles repeated until the battery capacity becomes 75% of the initial value of capacity with respect to each concentration of the electrolyte.

Figure 14:
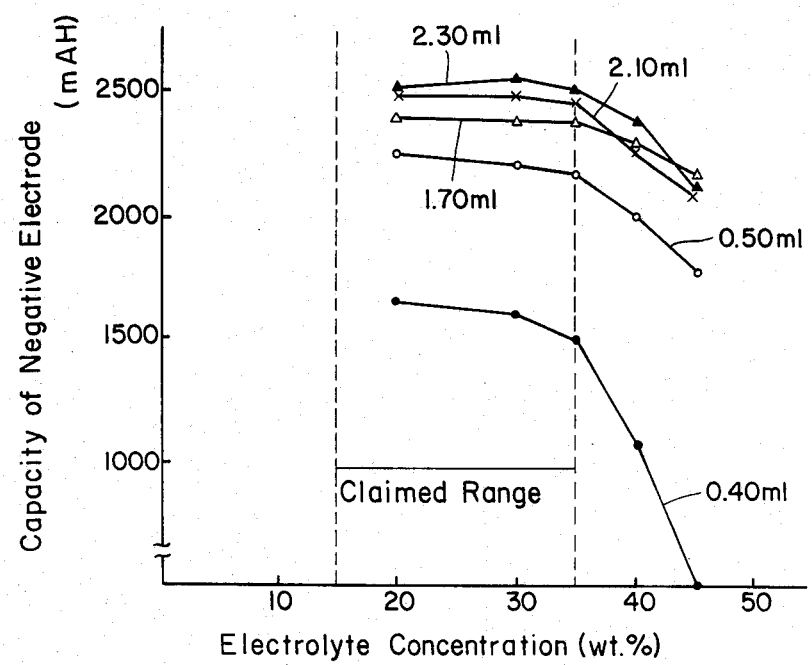
FIGS. 14 and 15 show the relationship between the concentration of electrolyte and capacity of the negative electrode at certain amounts of electrolyte.

FIG. 14 represents test data showing the relationship between the concentration of electrolyte and capacity of the negative electrode when the amount of electrolyte is fixed at 0.4 ml/AH, 0.5 ml/AH, 1.70 ml/AH, 2.10 ml/AH and 2.30 ml/AH with respect to the batteries of Example 5, after they were left to stand for 30 days. FIG. 14 shows that the desirable upper limit of the concentration range for each amount of electrolyte is 35 wt%.

Figure 15:
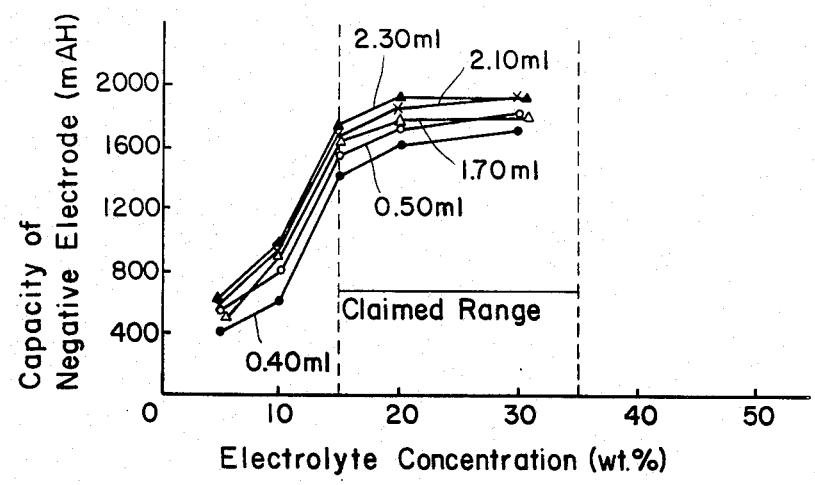

FIG. 15 shows the relationship between the concentration of electrolyte and capacity of the negative electrode after a 2000 mAH charge at an initial stage, when the amount of electrolyte is fixed at 2.30 ml/AH, 2.10 ml/AH, 1.70 ml/AH, 0.5 ml/AH and 0.4 ml/AH. FIG. 15 shows that the desirable lower limit of the concentration range for the electrolyte is 15 wt% with respect to each electrolyte amount, as far as the capacity of the negative electrode after 2000 mAH charge at the initial stage is concerned.

In view of, and based upon, the test results shown in FIGS. 13 through 15, the range for the amount of electrolyte is determined as being 0.50-2.10 ml/AH, and similarly the range for the concentration of electrolyte is determined as being 15-35 wt%.

EXAMPLE 6

The hydrogen-absorption reaction of the hydrogen-storage alloy is exothermic and, therefore, its hydrogen-absorbing capacity is reduced seriously at a high temperature. To overcome this defect, it is preferred to interpose a heat-conductive substance between the negative electrode comprising the hydrogen-storage alloy and the metal battery casing so as to release the heat from the negative electrode smoothly. For example, an electrode body is manufactured from a hydrogen-storage electrode prepared in the same manner as in Example 1, a known nickel positive electrode and a separator. The outer wall of the electrode body consists of the negative electrode. The electrode body is contacted with the casing as closely as possible to realize a structure wherein heat generated in the negative electrode is transferred rapidly to the casing. A battery having such a structure is shown in FIG. 11.

As shown in FIG. 11, the electrode body consists of a negative electrode 1 comprising a hydrogen-storage alloy, a positive electrode collector 2, an active material 3 of the positive electrode and a separator 4 which are kept in position within a battery casing 5. In this structure, the negative electrode is arranged just inside the casing 5 or on the outer wall of the electrode body as shown in FIG. 11. With this structure, heat can be released effectively from the negative electrode to lower the temperature of this electrode and make the charging operation smooth. As a result, a high capacity of the battery can be obtained particularly at a high temperature. In FIG. 11, reference numeral 6 is a terminal of the positive electrode and 7 is a safety valve. The safety valve 7 is designed so that it works under a pressure of, for example, 15 kg/cm$_2$ so as to control the internal pressure of the battery to 20 kg/cm$^2$ or less (refer to the above Example 3).

Figure 12:
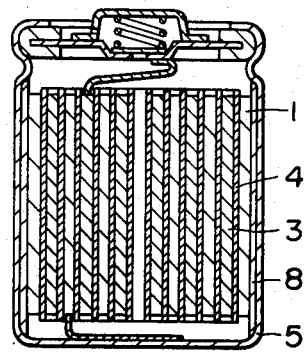

In another preferred embodiment, the positive and negative electrodes 1,3 are rolled with the separator 4 interposed between them into a swirl to form an electrode body, as shown in FIG. 12. The roll-constituting pressure of the swirled electrode body is 1.0 to 5.0 kg/cm$^2$. A preferred electrolyte is 15 to 35 wt.% aqueous potassium hydroxide solution and its amount is preferably 0.50 to 2.10 ml per AH of a theoretical capacity of the negative electrode 1. In the embodiment of FIG. 12 of the drawing, the battery casing 5 is made of a metal and its inner surface is in contact with the negative electrode 1 which constitutes the outer periphery of the electrode body through a greasy heat-conductive substance 8 as illustrated in FIG. 12.

Although the present invention has been described with reference to the preferred embodiments thereof, many modifications and alterations can be made within the spirit of the invention.

What we claim is:

1. A metal/hydrogen alkaline storage battery which comprises:
   a positive electrode comprising a metal oxide,
   a negative electrode comprising a hydrogen-storage alloy,
   a separator interposed between said positive electrode and said negative electrode and impregnated with an alkaline electrolyte, wherein said electrolyte is a 15 to 35 wt.% alkaline solution and the amount of said electrolyte is controlled to 0.50 to 2.10 ml per AH of the theoretical capacity of said negative electrode, and
   a battery casing for housing said positive and negative electrodes and said separator, wherein said battery casing comprises valve means having a valve which acts under pressure ranging from an equilibrium pressure in adsorption of hydrogen by said negative electrode to about 20 kg/cm$^2$, thereby maintaining the internal pressure of the battery below about 20 kg/cm$^2$.

2. A storage battery according to claim 1, wherein said hydrogen-storage alloy is selected from those which are capable of absorbing hydrogen under a pressure of about 20 kg/cm$^2$ or less at a temperature of up to about 70° C.

3. A storage battery according to claim 1, wherein said negative electrode comprises a hydrogen-storage alloy retained by an alkali-resistant synthetic resin binder and a thickener.

4. A storage battery according to claim 3, wherein said alkali-resistant synthetic resin binder is an unsintered fluororesin constituting a fibrous binding reticulation.

5. A storage battery according to claim 4, wherein said thickener is polyethylene oxide.

6. A storage battery according to claim 1, wherein said positive and negative electrodes are rolled up with the separator interposed between them to form an electrode body and the roll-constituting pressure of the electrode body is 1.0 to 5.0 kg/cm².

7. A storage battery according to claim 1, wherein said electrolyte is a 15 to 35 wt.% aqueous potassium hydroxide solution.

8. A storage battery according to claim 1, wherein said positive and negative electrodes and said separator constitute an electrode body having said negative electrode as an outer wall of said electrode body, said battery casing is made of a metal, and the inner surface of said casing is in contact with said negative electrode.

9. A storage battery according to claim 1, wherein said positive and negative electrodes and said separator constitute an electrode body having said negative electrode as an outer wall of said electrode body, said battery casing is made of a metal, and a greasy heat-conductive substance is disposed between the inner surface of said casing and said negative electrode.

* * * * *